(12) United States Patent
Mundell

(10) Patent No.: US 6,814,407 B2
(45) Date of Patent: Nov. 9, 2004

(54) SINGLE ACTUATOR FOUR-WAY POWER LUMBAR

(75) Inventor: Donald David Mundell, Carthage, MO (US)

(73) Assignee: L & P Property Management Company, South Gate, CA (US)

( * ) Notice: Subject to any disclaimer, the term of this patent is extended or adjusted under 35 U.S.C. 154(b) by 31 days.

(21) Appl. No.: 10/163,246

(22) Filed: Jun. 5, 2002

(65) Prior Publication Data

US 2003/0227203 A1 Dec. 11, 2003

(51) Int. Cl.⁷ ............................................... A47C 7/46
(52) U.S. Cl. ............................ 297/284.4; 297/284.2
(58) Field of Search ..................... 297/284.4, 284.2, 297/452.52, 452.53

(56) References Cited

U.S. PATENT DOCUMENTS

| | | | |
|---|---|---|---|
| 4,155,592 A | 5/1979 | Tsuda et al. | 297/284.4 X |
| 4,309,058 A | 1/1982 | Barley | 297/284.4 |
| 4,671,569 A | 6/1987 | Kazaoka et al. | 297/284.4 |
| 4,715,653 A | 12/1987 | Hattori et al. | 297/284.4 |
| 5,197,780 A | 3/1993 | Coughlin | 297/284.7 |
| 5,217,278 A | 6/1993 | Harrison et al. | 297/284.4 X |
| 5,449,219 A * | 9/1995 | Hay et al. | 297/284.4 |
| 5,474,358 A * | 12/1995 | Maeyaert | 297/284.4 X |
| 5,704,687 A * | 1/1998 | Klingler | 297/284.4 |
| 5,876,096 A | 3/1999 | Yamakami | 297/344.13 |
| 5,913,569 A * | 6/1999 | Klingler | 297/284.4 |
| 5,954,399 A * | 9/1999 | Hong | 297/284.4 |
| 6,007,151 A | 12/1999 | Benson | 297/284.4 |
| 6,050,641 A | 4/2000 | Benson | 297/284.4 |
| 6,152,531 A * | 11/2000 | Deceuninck | 297/284.4 |
| 6,158,300 A * | 12/2000 | Klingler | 297/284.4 X |
| 6,254,186 B1 | 7/2001 | Falzon | 297/284.2 X |
| 6,402,246 B1 * | 6/2002 | Mundell | 297/284.4 |
| 6,447,061 B1 * | 9/2002 | Klingler | 297/284.4 |
| 6,499,803 B2 * | 12/2002 | Nakane et al. | 297/284.4 |
| 6,595,585 B2 * | 7/2003 | Mundell | 297/284.4 |
| 6,601,919 B1 * | 8/2003 | Deceuninck | 297/284.4 |
| 2002/0109383 A1 * | 8/2002 | Klingler | 297/284.4 |
| 2002/0113471 A1 * | 8/2002 | Blendea et al. | 297/284.4 |
| 2002/0113472 A1 * | 8/2002 | Blendea et al. | 297/284.4 |
| 2002/0149245 A1 * | 10/2002 | Mundell | 297/284.4 |
| 2003/0085599 A1 * | 5/2003 | Mcmillen | 297/284.4 |
| 2003/0085600 A1 * | 5/2003 | Mori | 297/284.4 |

FOREIGN PATENT DOCUMENTS

| | | | |
|---|---|---|---|
| AU | 585714 B | 6/1989 | A47C/7/40 |
| DE | 3616155 A1 * | 11/1987 | 297/284.4 |

* cited by examiner

Primary Examiner—Rodney B. White
(74) Attorney, Agent, or Firm—Dennis J.M. Donahue, III; Grant D. Kang; Husch & Eppenberger LLC

(57) ABSTRACT

A lumbar support device has a seat frame, a pair of brackets connected to opposite sided of the seat frame, a pair of flexible members connected to the pair of brackets in such a manner as to respectively form a pair of center sections across the seat frame, and an actuator assembly operatively connected to each one of the flexible members. Each one of the flexible members preferably has a pair of levers on opposite sides of the center sections that rotate about the brackets. In operation, the actuator assembly selectively bows the center portions of the flexible members. The actuator assembly preferably includes a reversible gear and a pair of bowden cables that move one pair of levers when the reversible gear is rotated clockwise and move the other pair of levers when the reversible gear is rotated counter-clockwise.

20 Claims, 4 Drawing Sheets

SINGLE ACTUATOR FOUR-WAY POWER LUMBAR

CROSS-REFERENCE TO RELATED APPLICATIONS

This application is related to U.S. application Ser. No. 09/832,692, filed on Apr. 11, 2001, which has issued as U.S. Pat. No. 6,402,246.

BACKGROUND OF THE INVENTION

1. Field of the Invention

The present invention relates generally to lumbar support devices. More particularly, the present invention relates to lumbar support devices that are capable of changing shape, especially curvature in the lumbar region.

2. Related Art

Lumbar support devices have been integrated into seats to change their shape, thereby allowing each occupant to adjust the support provided by the seat. The curvature of these devices is traditionally adjustable so that an occupant can operate the device to push the seat forward towards the occupant's spinal column in the lumbar region. It is generally known to change the curvature of a lumbar support device using an actuator assembly that moves a support structure. It is also well known to provide an actuator assembly that is either manually operated, using a handle or knob, or power assisted, using a drive motor and control switches. It is further known to use a single actuator to selectively increase the tension in vertically-spaced, horizontal lumbar support elements and that support elements may be linked together. It is also known to use a single actuator to selectively arch and translate a lumbar support.

SUMMARY OF THE INVENTION

One aspect of the present invention relates to a lumbar support device having a seat frame, a pair of brackets connected to the seat frame, a pair of flexible members connected to the pair of brackets in such a manner as to respectively form a pair of center sections across the seat frame, and an actuator assembly operatively connected to each one of the flexible members. The actuator assembly selectively bows the center portions of the flexible members.

In the preferred embodiment, each one of the flexible members preferably has a pair of levers on opposite sides of the respective center sections, and the actuator assembly preferably includes a reversible gear and a pair of bowden cables. When the reversible gear is rotated clockwise, one pair of levers is moved and one of the center sections is bowed. When the reversible gear is rotated counter-clockwise, the other pair of levers is moved and the other center section is bowed.

It is an advantage of the present invention to provide a lumbar support device that is simple and affordable to manufacture.

It is another advantage of the present invention to provide a lumbar support device that can be adjusted at different vertical locations without any translation of individual flexible members.

It is yet another advantage of the present invention to provide a lumbar support device that can be adjusted at different vertical locations without any translation of the actuator assembly.

Further advantages of the present invention will be apparent from the description below with reference to the accompanying drawings in which like numbers indicate like elements.

DETAILED DESCRIPTION OF THE INVENTION

Figure 1:
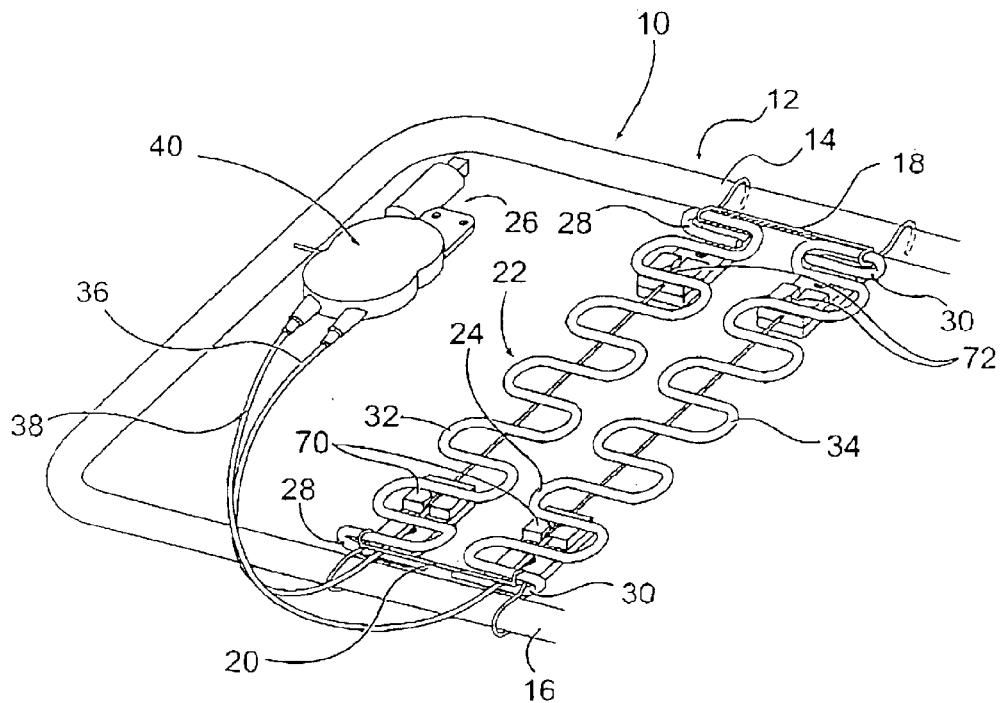
FIG. 1 illustrates an isometric view of the preferred embodiment of the lumbar support device installed in the frame.
Figure 2:
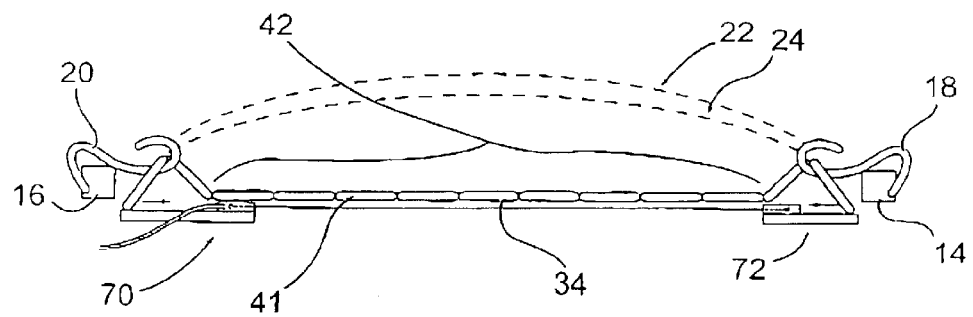
FIG. 2 illustrates a front level view of the preferred embodiment of the lumbar support device in a relaxed position and in actuated positions.

As shown in FIGS. 1 and 2, the preferred embodiment of a lumbar support device 10 generally includes a seat frame 12 having a first side 14 and a second side 16, a first bracket 18 and a second bracket 20 respectively attached to the first and second sides 14, 16, a first flexible member 22 and a second flexible member 24 respectively connected to the seat frame 12 through the pair of brackets 18, 20, and an actuator assembly 26 operatively connected to the flexible members 22, 24. Each one of the flexible members 22, 24 is preferably attached to the pair of brackets 18, 20 in such a manner as to form a pair of levers 28, 30 on opposite sides of the seat frame 12. The flexible members 22, 24 have center sections 32, 34 that extend across the seat frame 12 from the first side 14 to the second side 16, and the actuator assembly 26 preferably connects each one of the pair of levers 28, 30. In particular, the actuator assembly 26 preferably includes a pair of bowden cables 36, 38, one for each of the flexible members 22, 24, that extend from a gearbox 40 and are each respectively attached to one of the pair of levers 28, 30.

The particular operation of the gearbox 40 is described in detail below. In general, the actuator assembly 26 moves either one pair or both pairs of levers 28, 30. Each one of the pair of levers 28, 30 are rotatably connected to and cantilevered about the pair of brackets 18, 20. Accordingly, moving the levers 28, 30 causes them to rotate about the pair of brackets 18, 20, and thereby bow the center sections 32, 34. As discussed in detail below, the actuator assembly 26 can selectively operate on the flexible members 22, 24 resulting in the ability to individually and independently vary the amount of curvature in each one of the center sections 32, 34. In FIG. 2, broken lines illustrate actuated positions of the flexible members 22, 24.

The levers 28, 30 are preferably used to bow the center sections 3, 34 for their mechanical advantage. It will be appreciated that other devices can be used to bow the center sections 32, 34 and that, in general, the actuator assembly 26 moves the end of the center sections 32, 34 toward each other to increase curvature. It will also be appreciate that although each one of the flexible members 22, 24 is preferably formed with a spring 41, such as the sinusoidal springs particularly illustrated, other structural components may be used as the flexible members 22, 24, such as wires, straps, and plates. Preferably, each one of the center sections 32, 34 has a recessed portion 42 between the pair of levers 28, 30. Various shapes and combinations of flexible members 22, 24 are also discussed in co-pending patent application Ser. No. 09/832,692, which is incorporated herein by reference.

Figure 3:
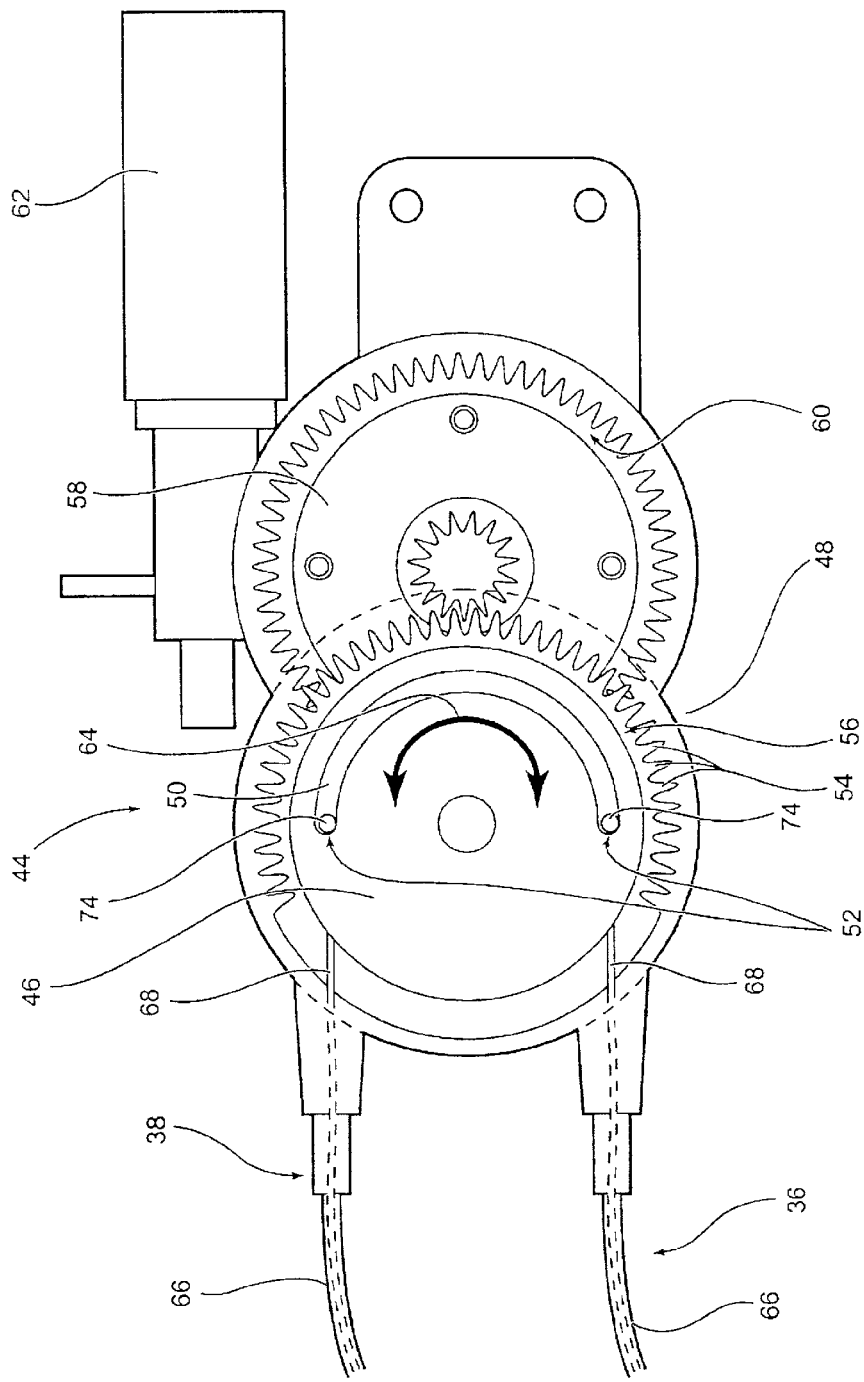
FIG. 3 illustrates a detailed cut-away view of one embodiment of the gear assembly.
Figure 4:
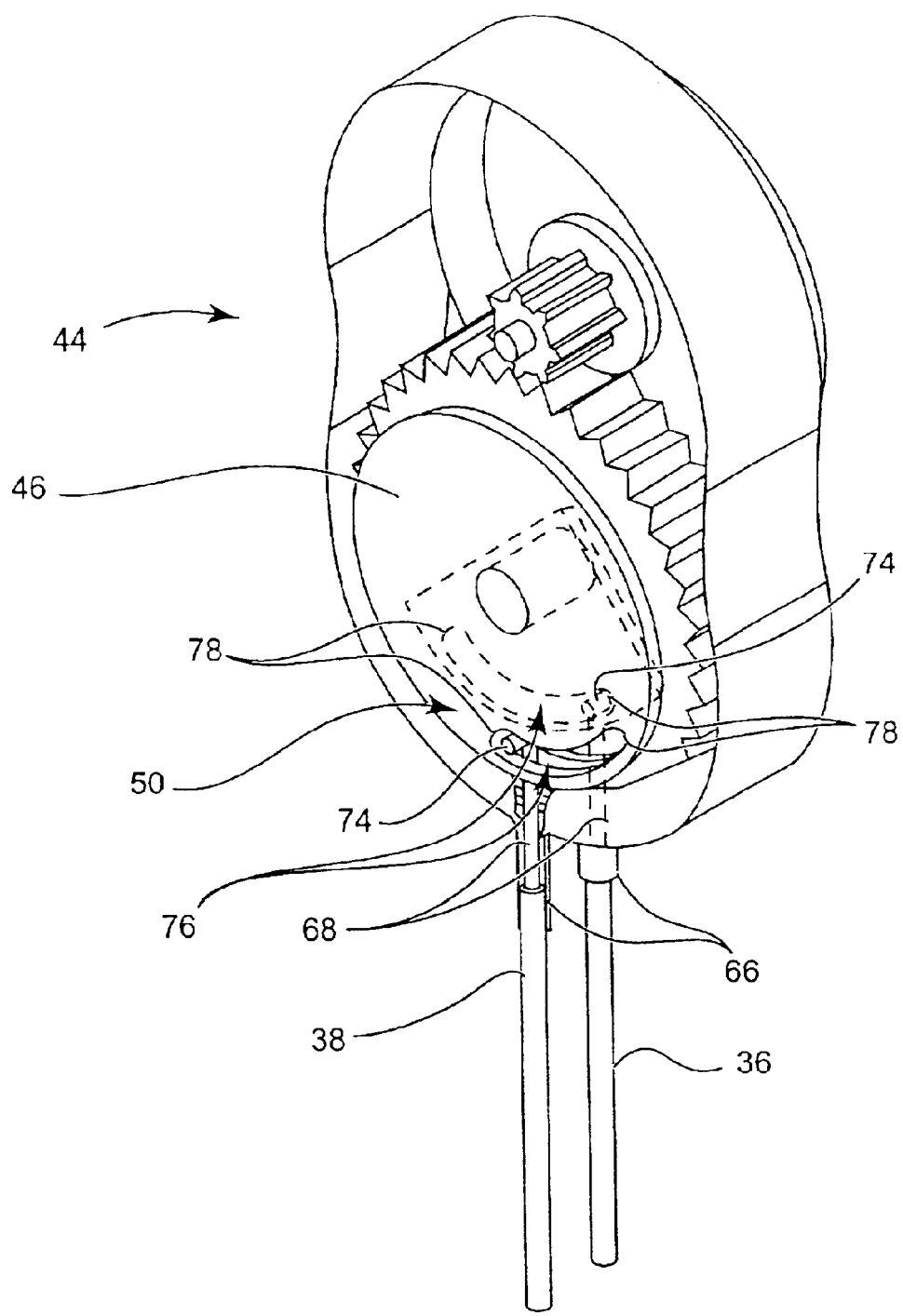
FIG. 4 illustrates a detailed cut-away view of another embodiment of the gear assembly.

According to the preferred embodiment of the invention, the actuator assembly 26 includes a gear assembly 44 connected to the pair of bowden cables 36, 38. Embodiments of the gear assembly are illustrated in FIGS. 3 and 4. In particular, the gear assembly 44 has a reversible gear 46 in a housing 48. The reversible gear has a slot 50 between a pair of opposite ends 52. Gear teeth 54 are preferably formed around at least a portion of the periphery 56 of the reversible gear 46. A driver gear 58 can mesh with the gear teeth 58 of the reversible gear 46. The driver gear 58 may also have peripheral teeth 60 that mesh with a drive motor 62. The drive motor 62 rotates the driver gear 58 which in turn rotates the reversible gear 46. In this manner, the reversible gear 46 can be moved clockwise and counter-clockwise 64. It will be appreciated that in another embodiment, the actuator assembly 26 may be manually operated, such as by using a handle or knob (not shown).

Each one of the bowden cables 36, 38 has a sheath 66 and a cable 68 extending between the actuator assembly 26 and the flexible members 22, 24. At the actuator assembly end, each one of the sheaths 66 is secured to the housing 48 and each one of the cables 68 extend through the sheaths 66 to the opposite ends 52 of the slot 50 in the reversible gear 46. At the flexible member end, each one of the sheaths 66 is secured to a sheath bracket 70 attached to one side of the pair of levers 28, 30 and each one of the cables 68 extends through the sheaths 66 to a cable bracket 72 attached to the other side of the pair of levers 28, 30 (see FIGS. 1 & 2).

The cables 68 can be secured to the reversible gear 46 by a pair of links 74 at the opposite ends 52 of the slot 50. Accordingly, when the reversible gear 46 is rotated in the clockwise direction, one of the links 74 is moved by its corresponding one of the opposite ends 52 and the other one of the links 74 slides in the slot 50. Similarly, when the reversible gear 46 is rotated in the counter-clockwise direction, the other one of the links 74 is moved by its corresponding one of the opposite ends 52 and the one of the links 74 slides in the slot 50. Depending on the direction of rotation of the reversible gear 46, one of the pair of levers 28, 30 are moved toward each other and the corresponding one of the center sections 32, 34 is bowed. In this manner, the curvature of the lumbar support device 10 can be adjusted at different vertical locations without any translation of the individual flexible members 22, 24 and without any translation of the actuator assembly 26. Instead, the curvature of the upper flexible member 22 increases upper support by the lumbar support device 10 and the curvature of the lower flexible member 24 increases lower support by the lumbar support device 10, and the curvature is selectable based on the amount of rotation and the direction of rotation of the reversible gear 46.

FIG. 4 particularly illustrates an embodiment of the gear assembly 44 in which a pair of slot segments 76 define the slot 50, and each one of the slot segments 76 has a pair of opposite ends 78. As with the gear assembly 44 illustrated in FIG. 3, the cables 68 can be secured to the reversible gear 46 by the pair of links 74 in the slot 50, i.e. in each one of the slot segments 76. By dividing the slot 50 into a pair of slot segments 76, each one with a pair of opposite ends 78, the actuator assembly 26 can simultaneously operate on both pair of levers 28, 30 to bow both flexible members 22, 24. As particularly illustrated in FIG. 2, the actuator assembly 26 can bow the center sections 32, 34 of the flexible members 22, 24 with varying amounts of curvature. For example, with a clockwise rotation of the reversible gear 46, the center sections 32, 34 could have a full-curvature and a partial-curvature (such as half), respectively, and with a counter-clockwise rotation of the reversible gear 46, the center sections 32, 34 could have a partial-curvature and a full-curvature, respectively.

Figure 5A:
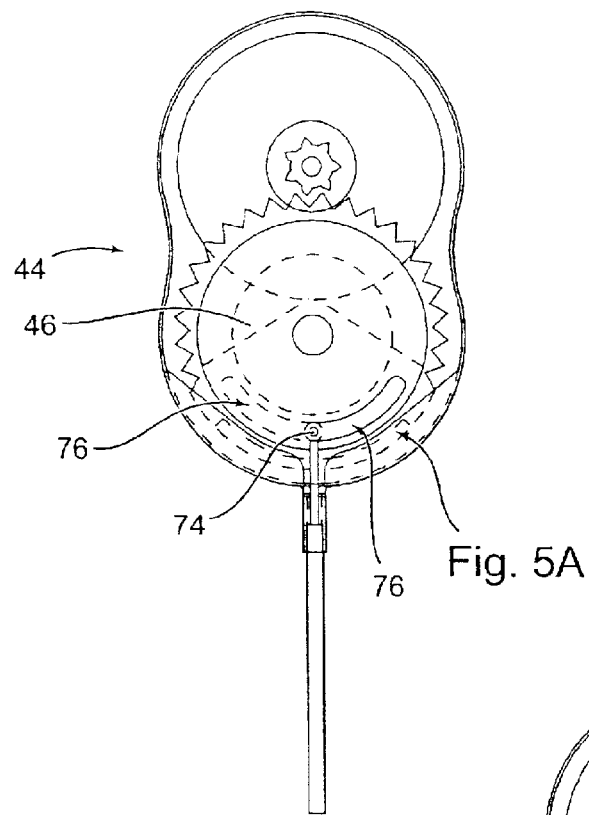
FIGS. 5A and 5B illustrate a sectional plan view of the gear assembly in neutral and actuated positions, respectively.
Figure 5B:
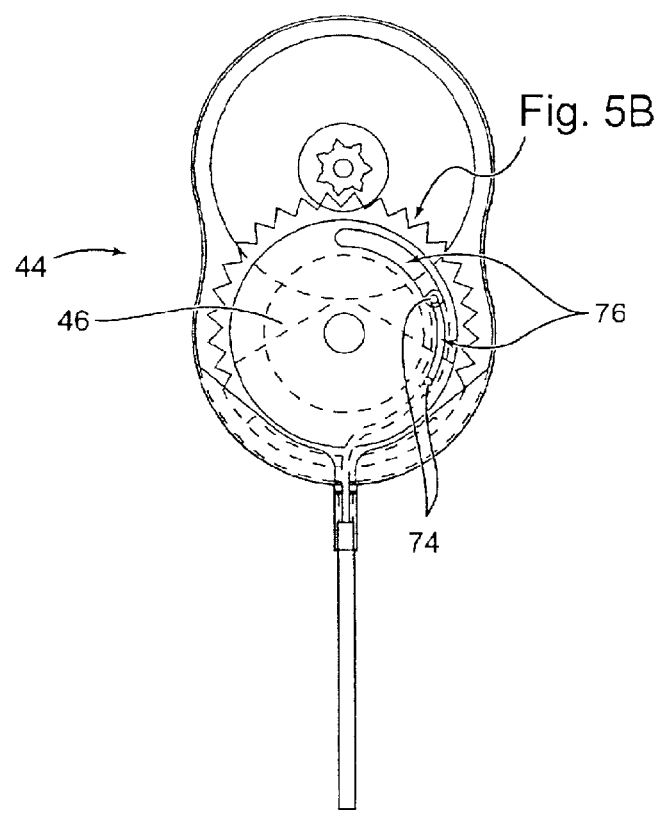

The slot segments 76 can simultaneously produce different levels of curvature in the upper and lower sections of the lumbar support device 10 because the pair of opposite ends 78 can independently move each one of the pair of links 74. In particular, FIGS. 5A and 5B illustrate the gear assembly 44 in a neutral position and an actuated position, respectively. In the neutral position, each one of the slot segments 76 holds the pair of links 74 at opposite ends of the slot segments 76. The actuated positions of the flexible members 22, 24 in FIG. 2, a full-curvature and a partial-curvature, correspond with the gear assembly 44 in the actuated position of FIG. 5B. As the gear assembly is moved from the neutral position to the actuated position, one of the slot segments 76 begins to immediately pull on one of the pair of links 74 while the other of the pair of links 74 slides in the other of the slot segments 76. As the slot segments 76 continue to rotate, eventually the second of the links 74 is also moved. Similarly, the full-curvature and partial-curvature in the flexible members 22, 24 can be reversed by reversing the direction of the reversible gear 46.

As various modifications could be made in the constructions and methods herein described and illustrated without departing from the scope of the invention, it is intended that all matter contained in the foregoing description or shown in the accompanying drawings shall be interpreted as illustrative rather than limiting. For example, bowden cables 36, 38 are one example of operative connections that can be made between the actuator assembly 26 and the flexible members 22, 24 according to the preferred embodiment of the present invention, and it will be evident to those skilled in the art that other examples of operative connections could include formed wires, rods, and other devices capable of tractively or pulsively operating on the flexible members 22, 24. Thus, the breadth and scope of the present invention should not be limited by any of the above-described exemplary embodiments, but should be defined only in accordance with the following claims appended hereto and their equivalents.

What is claimed is:

1. A lumbar support device, comprising:

a first flexible member comprising a first pair of levers and a first center section between said first pair of levers;

a second flexible member comprising a second pair of levers and a second center section between said second pair of levers; and an actuator assembly comprising a first operative connection to said first flexible member through said first pair of levers and comprising a second operative connection to said second flexible member through said second pair of levers, wherein said actuator assembly moves said first pair of levers to bow said first center section and wherein said actuator assembly moves said second pair of levers to bow said second center section, wherein said actuator further comprises a gear, said gear being movable in a first direction and in a second direction to move said first pair of levers and to move said second pair of levers, respectively, and wherein said first center section is adjusted to a first partial-curvature through said first operative connection as said gear is continued to be moved in said second direction until said second center section is adjusted to a second full-curvature, and wherein said second center section is adjusted to a second partial-curvature through said second operative connection as said near is continued to be moved in said first direction until said first center section is adjusted to a first full-curvature.

2. The lumbar support device according to claim 1, wherein at least one of said first flexible member and said second flexible member is further comprised of a spring.

3. The lumbar support device according to claim 1 wherein said first center section is comprised of a first recessed portion and wherein said second center section is comprised of a second recessed portion, and wherein said actuator assembly is further comprised of a reversible gear having a slot between a first end and a second end.

4. The lumbar support device according to claim 1, wherein said actuator assembly further comprises:
   a reversible gear comprising a housing and a slot between a first end and a second end, wherein said reversible gear is movable in a first direction and a second direction;
   a first link between said first end of said slot and said first operative connection, wherein said first link is moved by said first end when said reversible gear is moved in said first direction and wherein said first link slides in said slot when said reversible gear is moved in said second direction; and
   a second link between said second end of said slot and said second operative connection, wherein said second link is moved by said second end when said reversible gear is moved in said second direction and wherein said second link slides in said slot when said reversible gear is moved in said first direction.

5. The lumbar support device according to claim 4 wherein said first operative connection further comprises a first bowden cable and wherein said second operative connection further comprises a second bowden cable, wherein said first bowden cable comprises first sheath and a first cable and wherein said second bowden cable comprises a second sheath and a second cable, wherein said first sheath is connected between said housing of said reversible gear and one of said first pair of said levers and said first cable is connected between said link and another of said first pair of said levers, and wherein said second sheath is connect between said housing of said reversible gear and one of said second pair of said levers and said second cable is connected between said second link and another of said second pair of said levers.

6. The lumbar support device according to claim 4, wherein said slot further comprises a first slot segment and a second slot segment, each one of said slot segments comprising a first end and a second end, wherein said first end of said first slot segment moves said first link when said gear is moved in said first direction and said first link slides in said first slot segment when said gear is moved in said second direction until said first link is moved by said second end of said first slot segment, and wherein said second end of said second slot segment moves said second link when said gear is moved in said second direction and said second link slides in said second slot segment when said gear is moved in said first direction until said second link is moved by said first end of said second slot segment.

7. The lumbar support device according to claim 1, further comprising:
   a seat frame having a first side and a second side, said second side being locate distally from said first side; and
   a pair of brackets respectively attached to said first side and said second side, wherein said pair of brackets connect said first center section and said second center section to said frame and wherein said first center section and said second center section extend across said frame between said first side and said second side.

8. A lumbar support device, comprising:
   a first flexible member;
   a second flexible member; and
   an actuator assembly comprising a reversible gear having a slot between a first end and a second end, a first operative connection to said first flexible member, and a second operative connection to said second flexible member, a first link between said first end of said slot and said first operative connection, and a second link between said second end of said slot an said second operative connection, wherein said reversible gear is movable in a first direction and a second direction, wherein said first link is moved by said first end when said reversible gear is moved in said first direction and wherein said first link slides in said slot when said reversible gear is moved in said second direction, and wherein said second link is moved by said second end when said reversible gear is moved in said second direction and wherein said second link slides in said slot when said reversible gear is moved in said first direction, said movement of said first link producing a first curvature in said first flexible member through said first operative connection and said movement of said second link producing a second curvature in said second flexible member through said second operative connection.

9. The lumbar support device according to claim 8 wherein said first flexible member is further comprised of a first spring and wherein said second flexible member is further comprised of a second spring.

10. The lumbar support device according to claim 8 wherein first flexible member further comprises a first pair of levers and a first center section between said first pair of levers and wherein said second flexible member comprises a second pair of levers and a second center section between said second pair of levers.

11. The lumbar support device according to claim 10 wherein said first center section is comprised of a first recessed portion and wherein said second center section is comprised of a second recessed portion.

12. The lumbar support device according to claim 10 wherein said actuator assembly further comprises a housing of said reversible gear and a drive motor operatively connected to said reversible gear, wherein said first operative connection further comprises a first bowden cable and wherein said second operative connection further comprises a second bowden cable, wherein said first bowden cable comprises a first sheath and a first cable and wherein said second bowden cable comprises a second sheath and a second cable, wherein said first sheath is connected between said housing of said reversible gear and one of said first pair of said levers and said first cable is connected between said first link and another of said first pair of said levers, and wherein said second sheath is connected between said housing of said reversible gear and one of said second pair of said levers and said second cable is connected between said second link and another of said second pair of said levers.

13. The lumbar support device according to claim 8, wherein said slot further comprises a first slot segment and a second slot segment, each one of said slot segments comprising a first end and a second end, wherein said first end of said first slot segment moves said first link when said gear is moved in said first direction and said first link slides said first slot segment when said gear is moved in said second direction until said first link is moved by said second end of said first slot segment, and wherein said second end of said second slot segment moves said second link when said gear is moved in said second direction and said second link slides in said second slot segment when said gear is moved in said first direction until said second link is moved by said first end of said second slot segment.

14. The lumbar support device according to claim 13 wherein said first curvature in said first flexible member is greater than said second curvature in said second flexible member when said gear is moved in said first direction and wherein said second curvature in said second flexible member is greater than said first curvature in said first flexible member when said gear is moved in said second direction.

15. The lumbar support device according to claim 8, further comprising:
   a seat frame having a first side and a second side, said second side being located distally from said first side; and
   a pair of brackets respectively attached to said first side and said second side, wherein said pair of brackets connect said first flexible member and said second flexible member to said frame and wherein said first flexible member and said second flexible member extend a across said frame between said first side and said second side.

16. A lumbar support device, comprising:
   a first support member comprising a first center section between a first side and a second side, said first side being located distally from said second side;
   a second support member comprising a second center section between said first side and said second side, said second support member being positioned at a different location from said first support member; and
   an actuator assembly comprising a gear, a first operative connection to said first support member from said gear, and a second operative connection to said second support member from said gear, wherein said gear is movable in a first direction and a second direction, wherein said first support member is adjusted through said first operative connection when said gear is moved in said first direction, and wherein said second support member is adjusted through said second operative connection when said gear is moved in said second direction, said first support member and said second support member being adjusted without any translation of said actuator assembly and without any translation of at least one of said first member and said second member.

17. The lumbar support device according to claim 16 wherein said first center section is adjusted to a first partial-curvature through said first operative connection as said gear is continued to be moved in said second direction until said second center section is adjusted to a second full-curvature, and wherein said second center section is adjust to a second partial-curvature through said second operative connection as said gear is continued to be moved in said first direction until said first center section is adjusted to a first full-curvature.

18. The lumbar support device according to claim 16 wherein said first center section is comprised of a first recessed portion and wherein said second center section is comprised of a second recessed portion, wherein said first support member is further comprised of a first pair of levers one of said first pair of levers connected to said first center section proximate to said first side and another of said first pair of levers connected to said center section proximate to said second side, and wherein said second support member is further comprised of a second pair of levers one of said second pair of levers connected to said second center section proximate to said first side and another of said second pair of levers connected to said second center section proximate to said second side.

19. The lumbar support device according to claim 16 wherein said gear is comprised of a reversible gear having a slot between a first end and a second end, wherein said first operative connection further comprises a first bowden cable and wherein said second operative connection further comprises a second bowden cable.

20. The lumbar support device according to claim 16, further comprising a seat frame, wherein at least one of said first support member, said second support member, and said actuator assembly is operatively connected to said seat frame without any translation thereof with respect to said seat frame.

* * * * *

UNITED STATES PATENT AND TRADEMARK OFFICE
CERTIFICATE OF CORRECTION

PATENT NO. : 6,814,407 B2  
DATED : November 9, 2004  
INVENTOR(S) : Mundell

It is certified that error appears in the above-identified patent and that said Letters Patent is hereby corrected as shown below:

Column 4,  
Lines 6-7, "connection as said near is" should read -- connection as said gear is --

Column 5,  
Line 40, "second sheath is connect" should read -- second sheath is connected --  
Line 62, "being locate distally from" should read -- being located distally from --

Column 6,  
Line 12, "said slot an said second" should read -- said slot and said secon --

Column 7,  
Line 1, "said first slot segment when" should read -- in first slot segment when --

Column 8,  
Line 12, "section is adjust to a second" should read -- section is adjusted to a second --  
Line 24, "connected to said center" should read -- connected to said first center --

Signed and Sealed this

Eighth Day of February, 2005

JON W. DUDAS  
*Director of the United States Patent and Trademark Office*